United States Patent [19]

Cowan et al.

[11] Patent Number: 5,029,087

[45] Date of Patent: Jul. 2, 1991

[54] ELECTRONIC CONTROL SYSTEM FOR CONTROLLING TORQUE CONVERTER BYPASS CLUTCHES

[75] Inventors: Ronald T. Cowan, Troy; Roger L. Huffmaster, Canton; Pramod K. Jain, Farmington Hills, all of Mich.

[73] Assignee: Ford Motor Company, Dearborn, Mich.

[21] Appl. No.: 383,506

[22] Filed: Jul. 24, 1989

[51] Int. Cl.⁵ .................... B60K 41/06; F16D 31/08; F16D 43/28

[52] U.S. Cl. .................... 364/424.1; 74/866; 74/867; 192/3.3

[58] Field of Search .............. 364/424.1; 74/864, 866, 74/867, 868; 192/0.032, 0.033, 0.052, 0.076, 3.3, 3.31

[56] References Cited

U.S. PATENT DOCUMENTS

| | | | |
|---|---|---|---|
| 3,252,352 | 5/1966 | General et al. | 74/465 |
| 3,497,043 | 2/1970 | Leonard | 192/0.052 |
| 4,090,417 | 5/1978 | Burcz et al. | 74/864 |
| 4,468,988 | 9/1984 | Hiramatsu et al. | 74/868 |
| 4,487,303 | 12/1984 | Boueri et al. | 192/0.052 |
| 4,660,697 | 8/1987 | Yoneda et al. | 192/0.033 |
| 4,724,939 | 2/1988 | Lockhart et al. | 192/3.3 |
| 4,725,951 | 2/1988 | Niikura | 364/424.1 |
| 4,732,245 | 3/1988 | Hiramatsu | 192/0.032 |
| 4,757,886 | 7/1988 | Brown et al. | 192/3.3 |
| 4,765,450 | 8/1988 | Kurihara et al. | 192/0.052 |
| 4,795,015 | 1/1989 | Hibino et al. | 192/0.076 |
| 4,858,499 | 8/1989 | Ito et al. | 192/3.31 |
| 4,875,391 | 10/1989 | Leising et al. | 74/866 |

*Primary Examiner*—Felix D. Gruber
*Attorney, Agent, or Firm*—Frank G. McKenzie; Keith L. Zerschling

[57] ABSTRACT

A control for a hydrokinetic torque converter lockup clutch having a clutch plate that cooperates with a torque converter impeller shell to define a control pressure cavity wherein the clutch plate is subjected to the pressure in the torus circuit of the torque converter and wherein an electronically controlled valve system is used to modulate the pressure in the control pressure cavity thereby varying the clutch capacity to establish a controlled degree of slip of the clutch so that the actual slip of the clutch may be maintained at a target slip value which is adjusted depending upon the value of input shaft speed data and throttle position data stored in the memory of a microprocessor, the microprocessor being designed to calibrate a desired slip value for each engine torque and turbine speed condition whereby a closed-loop electronic control may be achieved to provide a partial converter bypass during the major portion of the vehicle operating time.

24 Claims, 12 Drawing Sheets

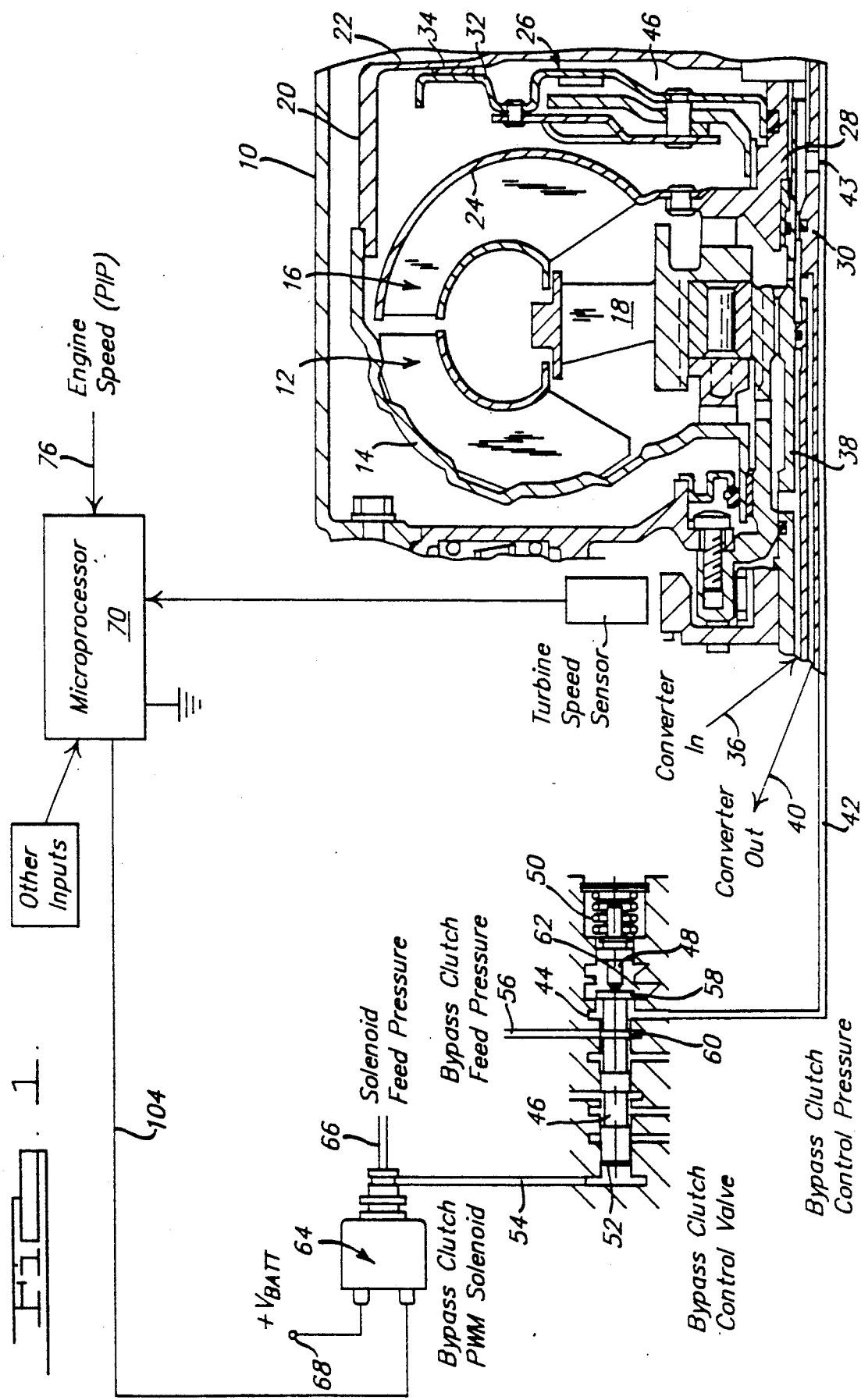

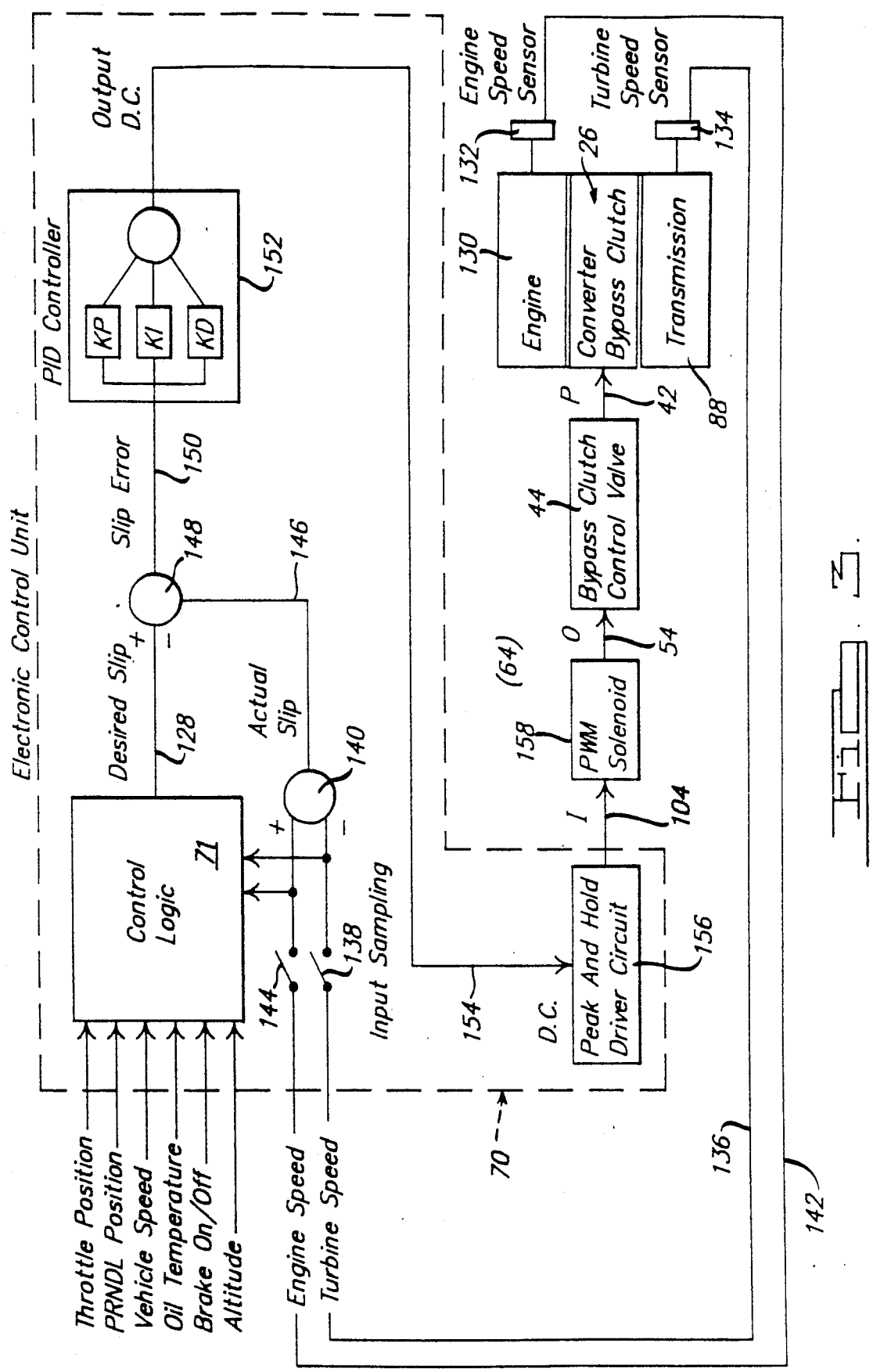

Summary Of Determination Of Operating Mode

1

ELECTRONIC CONTROL SYSTEM FOR CONTROLLING TORQUE CONVERTER BYPASS CLUTCHES

BACKGROUND OF THE INVENTION

In a hydrokinetic torque converter transmission engine torque is distributed directly to the impeller of a hydrokinetic torque converter. The impeller and a turbine are disposed in a closed toroidal fluid flow circuit that includes a bladed stator located at the flow exit section of the turbine and the flow entrance section of the impeller. Engine torque thus is multiplied by the converter during operation in the converter torque multiplication mode. The multiplied torque of the turbine is distributed to the torque input elements of a multiple speed ratio planetary gear unit, the output of which is transferred to the vehicle traction wheels.

When the torque converter approaches a hydrokinetic coupling point as the vehicle is operating under a steady state cruising condition, a continuous slip occurs in the converter by reason of the hydrokinetic action of the turbine and the impeller. The converter thus contributes to smooth torque transfer from the engine to the traction wheels, but it is inherently inefficient because of the hydrokinetic losses in the converter.

It is known in the prior art to provide a lockup clutch to connect directly the impeller and the turbine during steady state cruising thereby eliminating the undesirable slippage which contributes to inefficiency. In a typical driveline the speed ratio that might occur under moderate highway speeds would be approximately 85% to 90%.

Examples of this can be seen by referring to U.S. Pat. No. 3,252,352 issued to Norman T. General, Po-lung Liang, and Robert P. Zundel on May 24, 1966. Another example is seen in U.S. Pat. No. 3,497,043 issued to Richard L. Leonard in February 1970. Both of these patents are assigned to the assignee of this invention.

Known bypass clutches for converters of this kind establish a fully mechanical torque transfer that bypasses the hydrokinetic unit. This introduces a source for undesirable transient torque fluctuations and tends to increase the noise, vibration and harshness of the driveline both during steady state operation and during transient operating conditions when the clutch is released or applied—for example, during shifts. One attempt to solve this problem of noise, vibration and harshness involves introducing in the driveline a damper that establishes a resilient connection between the output torque transfer element of the lockup clutch and the turbine shaft. Usually spring means are used in the damper in cooperation with friction coulomb devices for cushioning transient torque fluctuations while introducing a damper action that tends to stabilize the torque transfer.

Other prior teachings deal with lockup clutches and controls that will achieve a controlled slippage of the clutch during torque transmission so that the benefits of the hydrokinetic torque multiplication can be partially achieved while a portion of the driving torque is transmitted mechanically through the slipping bypass clutch. Such clutch designs are feasible in certain driveline arrangements in the automotive industry that employ friction materials that will be compatible with long term continuous slipping and that will make provision for dissipation of the heat that is generated because of the slipping action of the clutch. Examples of such a slipping clutch arrangement are shown in U.S. Pat. No. 4,468,988, issued Sep. 4, 1984, U.S. Pat. No. 4,660,697 issued April 28, 1987, and U.S. Pat. No. 4,725,951 issued Feb. 16, 1988. In the modulated bypass clutch of the '988 patent the circuit pressure in the converter torus is controlled electronically so that a desired degree of slippage occurs depending upon the driving conditions. The circuit pressure is used as the clutch actuating pressure that is applied to a clutch disc that cooperates with the friction surface carried by the impeller housing, the clutch disc in turn being connected resiliently to the torque converter turbine.

In controlling the magnitude of the clutch slippage during operation of the system of the '988 patent a target slip is set according to a manifold pressure or throttle position and engine speed. Sensors are used for detecting whether the engine, manifold pressure or throttle setting and the turbine shaft speed are related in such a way that a so called engagement zone for the clutch is effective. Both engine speed and manifold pressure or throttle position are used together with other engine variables to detect the operating condition of the engine.

In the '951 patent a torque converter lockup clutch control establishes a calculated converter slip range by controlling the duty cycle for a pulse width modulated solenoid control valve that in turn controls the pressure that actuates the clutch. The duty cycle is determined in accordance with the load on the engine so the lockup clutch is controlled in accordance with the gain for the solenoid valve whereby slippage in the torque converter is allowed to adjust to a preset value as the load changes.

The '697 patent describes a slipping bypass clutch control that calculates a time change in the slip during operation of the driveline and calculates a slip deviation between a preset target slip and the calculated slip. Engaging force of the clutch is controlled by a duty cycle controlled solenoid valve which acts on a regulator valve for the converter clutch. The duty cycle for the solenoid valve is adjusted in accordance with the computation of the controller which computes a corrected slip during each background control loop which takes into account the slip error that was determined in the previous background loop.

The controller of the '951 patent also uses a solenoid valve for controlling a regulator valve for the clutch. A control gain for the solenoid valve is altered in accordance with a computed value that is a function of the throttle opening and the engine speed. At any instant the computed value can be larger or smaller than a desired slippage, and either a positive compensation or a negative compensation occurs depending upon the output signal or gain that is calculated.

Another related prior teaching is found in Burcz et al U.S. Pat. No. 4,090,417 which shows a lockup torque converter control wherein a capacity modulator valve is used to establish a modulated pressure behind a clutch plate in order to reduce the engaging force in those instances when the engine is operating with partial throttle thereby inducing a slip and establishing a condition of incipient slip. This eliminates harshness in the engagement of the clutch. The capacity modulator valve functions to modulate the pressure made available behind the clutch plate in accordance with the engine throttle setting. Thus the capacity of the clutch is matched to the torque being distributed by the engine through the driveline under each operating condition.

BRIEF DESCRIPTION OF THE INVENTION

Our invention is distinguishable from the prior art devices mentioned in the preceeding discription. It differs from the '988 patent by establishing an actual slip calculation that depends upon engine speed and turbine speed rather than the engine operating conditions, which would include engine speed and manifold pressure or throttle setting as well as other engine variables. The controller of the present invention reduces the slip error using a calculation that takes into account the desired slip less a computed actual slip. That calculation also takes into account a slip error that is equal to the desired slip minus an actual slip. That difference equals a percentage of the actual slip less the final target slip, the target slip being a value that is stored in the controller memory. That value is obtained from tables of throttle position versus turbine shaft speed. Further, the controller of the present invention varies the pressure behind the clutch plate rather than the circuit pressure itself. Control fluid is circulated through the torus circuit in the normal manner through a three-pass system to effect adequate cooling as the heat that is generated during slipping action of the clutch is dissipated.

The present design differs from the teachings of the '697 patent because in the present design the existing slip error is calculated using an actual, measured slip. The slip error is determined to be the difference between a desired slip and the measured slip. The difference in the present error and the error that occurred during a previous background control loop of the controller is determined, and that value is used with a corresponding value for the present control loop to get a rate of change in the error. A duty cycle then is computed as a result of that computation so that the bypass clutch control valve, which is sensitive to changes in duty cycle, will produce a controlled decay of slip with respect to time.

The torque converter bypass clutch control system of our invention is capable of reducing unacceptable noise vibration and harshness in the driveline due to the engagement of the clutch. The invention thus comprises a closed loop electronic control for providing a partial rather than a full converter bypass during a major portion of the vehicle operating time with little or no deterioration in the vehicle noise, vibration and harshness. It is possible therefore for the bypass clutch to improve fuel economy because of lower engine operating speeds and higher loads. Also the fuel economy is improved because the converter operates near 100% efficiency when it is locked up as in the case of a conventional on-off type converter.

The controls for the clutch develop a variable hydraulic pressure in the bypass clutch release chamber through the use of an electrohydraulic pulse width modulated solenoid valve which varies the hydraulic output pressure in proportion to input duty cycle described above. The converter slip is measured by using engine RPM and torque converter output shaft speed sensors, and that value is subtracted from the so called desired slip to obtain the above described slip error. That error then is used to address the duty cycle memory register for the appropriate value which in turn causes an adjustment of the input to the pulse width modulated solenoid. The desired slip depends upon information from a throttle position sensor, an engine speed sensor, a gear shift selector sensor, oil temperature sensor and transmission input shaft speed sensor whereby the bypass clutch capacity is adjusted to a value that is necessary to achieve the desired slip at any given torque. Torque transients caused by engine operating variables, transmission ratio shifting or throttle movements are then absorbed by momentary periods of increased slip as the bypass clutch solenoid output signal is adjusted during each background control loop of the processor in accordance with the new torque condition.

The converter clutch is a wet clutch located within the torque converter housing where it is continuously subjected to torque converter fluid. It establishes an alternate mechanical torque flow path to complement the hydrokinetic torque flow delivery. Increased fuel economy results from the reduced torque converter slippage that is obtained by reason of the application of the clutch.

Converter fluid is circulated through the converter clutch circuit using a so called three-pass flow path wherein a continuous flow of converter fluid enters the system through a sleeve shaft arrangement in the impeller hub and turbine shaft assembly. A flow exit passage independent of the clutch control passage extends from the torus circuit to an oil cooler. A third portion of the three-pass system communicates with a control chamber behind a clutch plate that cooperates with the converter impeller shell.

When the clutch is engaged a closed loop controller calculates converter slip using engine RPM and turbine speed or transmission input shaft speed. That slip is compared to the desired value described above to determine slip error and the error is used to determine an appropriate duty cycle which will reduce the error and over time develop a controlled deterioration in the slip error until a target value is reached.

The desired slip is determined by the actual slip and the final target slip value, causing an exponential decay in the slip as the final target slip is approached. The desired slip is equal to the actual slip less a predetermined slip reduction factor less than unity multiplied by the difference between the actual slip and the final target slip. This results in a variation in slip as the final target slip is approached, and the time required for that control varies depending upon the transmission gear ratio. The final target slip is a value that is stored in tables in the memory of the processor. The table value is dependant upon throttle position and turbine speed.

BRIEF DESCRIPTION OF THE FIGURES OF THE DRAWINGS

FIG. 1 is a schematic representation of a torque converter and bypass clutch assembly and a bypass clutch control valve together with a microprocessor for controlling the bypass clutch control valve.

FIG. 3 is a modulated bypass clutch control system block diagram.

FIG. 6 is a plot of bypass clutch slip versus time during the clutch engagement mode.

FIG. 6A is a plot, corresponding to FIG. 6, showing the actual slip and the desired slip for each of successive control loops of the microprocessor.

PARTICULAR DESCRIPTION OF THE INVENTION

Figure 2A:
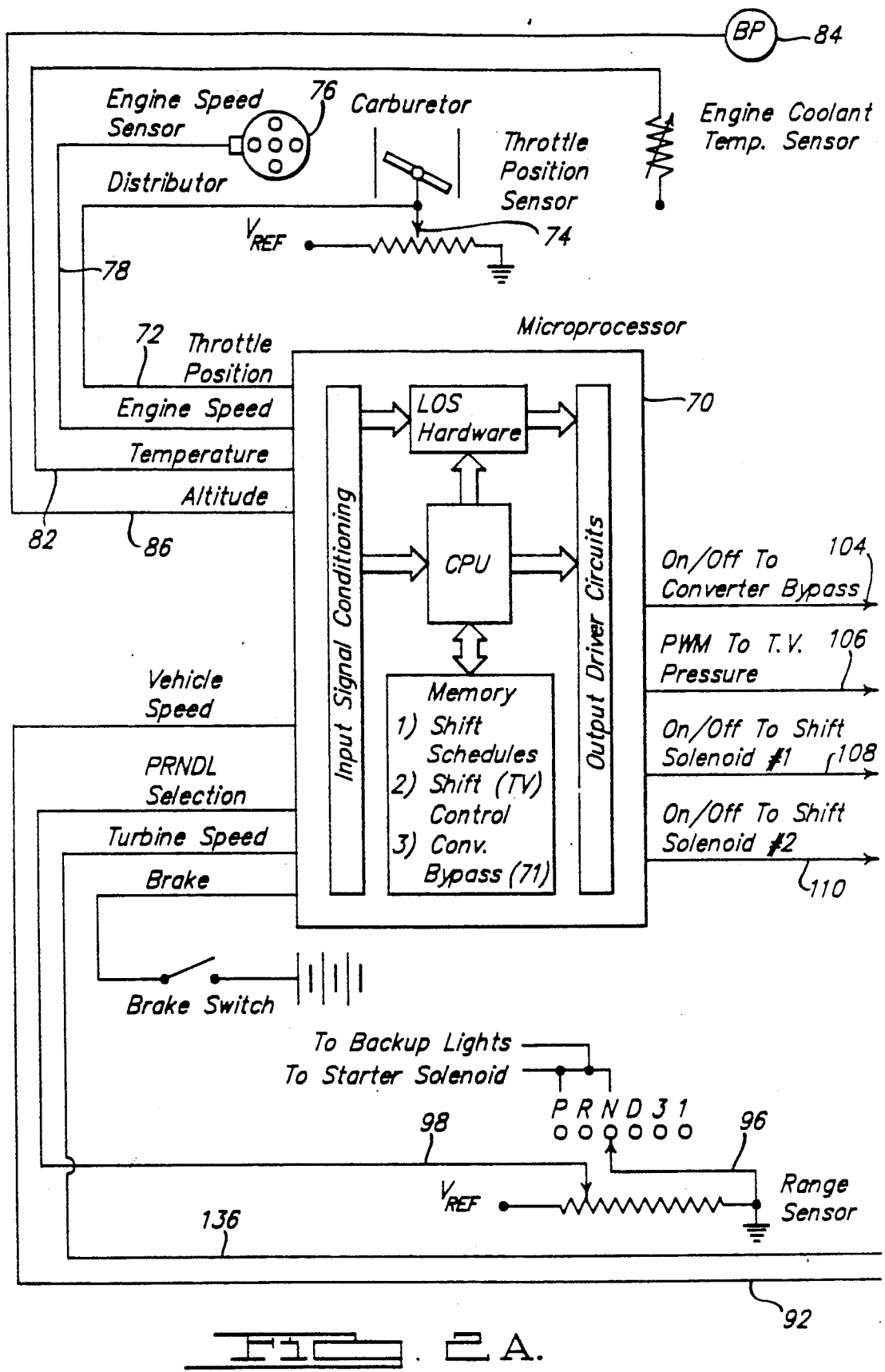
FIGS. 2A and 2B show a schematic diagram of the processor and its schematic relationship with respect to the electrohydraulic controls for controlling a transmission with multiple ratios.

In FIG. 1 numeral 10 designates transmission housing. Numeral 12 designates a hydrokinetic torque converter having an impeller 14, a bladed turbine 16 and a bladed stator 18, the latter being located between the flow entrance section of the impeller 14 and the flow exit section of the turbine 16. The impeller, the turbine and the stator are arranged in toroidal flow relationship in known fashion.

The impeller forms a part of an impeller assembly that includes impeller shell 20 having a radial wall 22. A cavity within the impeller housing 20 is formed between the shroud 24 of the turbine and the end wall 22. A clutch plate and damper assembly 26 is disposed in that cavity.

Assembly 26 is splined to turbine hub 28, which in turn is splined to turbine sleeve shaft 30 extending through the hub of stator 18 and the hub of impeller 14.

For a particular description of a torque converter and transmission system of the kind disclosed in this patent, reference may be made to U.S. Pat. No. 4,633,738 issued to Timte and U.S. Pat. No. 4,665,770 issued to Van Selous, both of which patents are assigned to the assignee of this invention. Reference may be made to those prior art patents for the purpose of supplementing this disclosure.

When the clutch plate 32 is pressurized by the pressure in the torus circuit, the friction surface 34 on the radially outward margin of the pressure plate engages the impeller shell thereby establishing a mechanical torque flow path between the impeller and the turbine, the former being connected to the crankshaft of an internal combustion engine. Pressure is distributed to the torus circuit through a flow passage that is defined in part by ports formed in stationary stator sleeve shaft 38 that surrounds the turbine sleeve shaft 30. A similar flow path defined by the sleeve shaft arrangement for the converter is provided for accommodating the flow of converter fluid from the torus circuit, the flow path being shown schematically at 40 in FIG. 1.

The sleeve shaft arrangement defines also a central converter bypass clutch control pressure passage 42 which communicates through a radial port 43 in the turbine shaft 30 with clutch control chamber 46 formed between the clutch plate and damper assembly 26 and the adjacent wall 22 of the impeller housing 20.

Control pressure passage 42 communicates with a bypass clutch control valve 44 which comprises a multiple land valve spool 46 and an aligned valve plunger 48. Valve spring 50 urges the plunger 48 and the multiple land valve spool 46 in a left hand direction. That spring force is opposed by a pressure force acting on the end of land 52 of multiple land valve spool 46. Pressure is distributed to the valve chamber on the left side of the land 52 through a bypass clutch solenoid pressure passage 54.

A bypass clutch feed pressure passage 56 communicates with a control valve 44 at a location intermediate valve lands 58 and 60, the latter being smaller than the former so that a feedback pressure force opposes this force of the spring 50. Bypass clutch control pressure passage 42 communicates with the valve 44 at a location intermediate lands 58 and 60. Land 58 controls the degree of communication between passage 56 and exhaust port 62.

A pulse width modulated solenoid actuator and valve assembly is shown at 64. Solenoid feed pressure is distributed to the actuator and valve assembly 64 through a feed passage 66. For a description of the mode of operation and the construction of a bypass clutch solenoid of the type illustrated schematically in FIG. 1, reference may be made to U.S. Pat. application Ser. No. 317,400, filed March 1, 1989, by Ralph Bolz now U.S. Pat. No. 4,919,012. That application is assigned to the assignee of this invention.

The solenoid valve driver is powered by battery 68. An electronic microprocessor, which will be described with reference to FIG. 2, is shown in FIG. 1 at 70. As will be described subsequently, the processor 70 receives input signals from various sensors which measure engine and vehicle operating conditions. The output of the microprocessor is transferred through lead 104 to the bypass clutch pulse width modulated solenoid 64. The solenoid valve controlled by the pulse width modulated solenoid modulates the pressure in the solenoid feed pressure passage 66 and delivers a control signal through line 54 to the bypass clutch control valve. The clutch control valve is calibrated to receive the control pressure of the solenoid output to establish in line 42 and in control chamber 46 a pressure that will determine the controlled slip of the clutch.

FIG. 2A shows in schematic form the architecture of the processor 70 as well as the relationship of the processor to the hydraulic control valve body and to the transmission clutches and brakes. FIG. 2A shows the schematic arrangement of the various sensors with respect to the processor and the hydraulic control valve body.

The sensors, together with transducers not specifically illustrated in FIG. 2A, convert physical signals to electrical signals. Physical signals include throttle position or engine manifold pressure, engine speed and transmission gear ratio selection as well as other variables such as engine temperature and the vehicle brake condition. The processor inputs these signals and operates on them according to a control program or a strategy and then outputs the results to certain actuators which function in cooperation with the hydraulic valve body to control the transmission. Processor 70 includes the central processing unit or CPU which comprises a computation unit and a control unit. An internal control bus establishes a relationship between a memory unit and the processing unit. Other internal busses establish a relationship between the CPU and the input conditioning signal circuit and the output driver circuit.

The CPU executes programs that are fetched from memory and provide the timing and controlled values of the output signals to the hydraulic control valve body of the transmission. The input signal conditioning and the output driver system allow the microprocessor to read the input data from the microprocessor under the program control.

The memory portion of the processor 70 stores programs and data and provides data to the processor as well as accepting new data from the processor for storage.

The memory portion of the processor 70 of FIG. 2 includes two types of memory; first, a read only memory or ROM which stores information or data that is read by the processor in each background loop and, second, a random access memory or RAM which holds or temporarily stores the results of the computations of the CPU as well as other data. The contents of the RAM can be erased, rewritten or changed depending upon the operating conditions of the vehicle.

The two types of memory are stored in an integrated circuit in the form of a microprocessor chip whereas the computations performed by the CPU are the result of the function of a second integrated circuit comprising a separate microprocessor chip, the two chips being connected by an internal bus and interface circuitry.

One of the input signals to the processor 70 is a throttle position signal in line 72 which is received by a position sensor 74. An engine speed sensor 76 in the form of a profile and ignition pickup (PIP) delivers an engine speed signal through line 78 to the processor 70. An engine coolant sensor 80 delivers an engine temperature signal through line 82 to the processor 70. A barometric pressure sensor 84 delivers an altitude signal through line 86 to the processor 70.

Figure 2B:
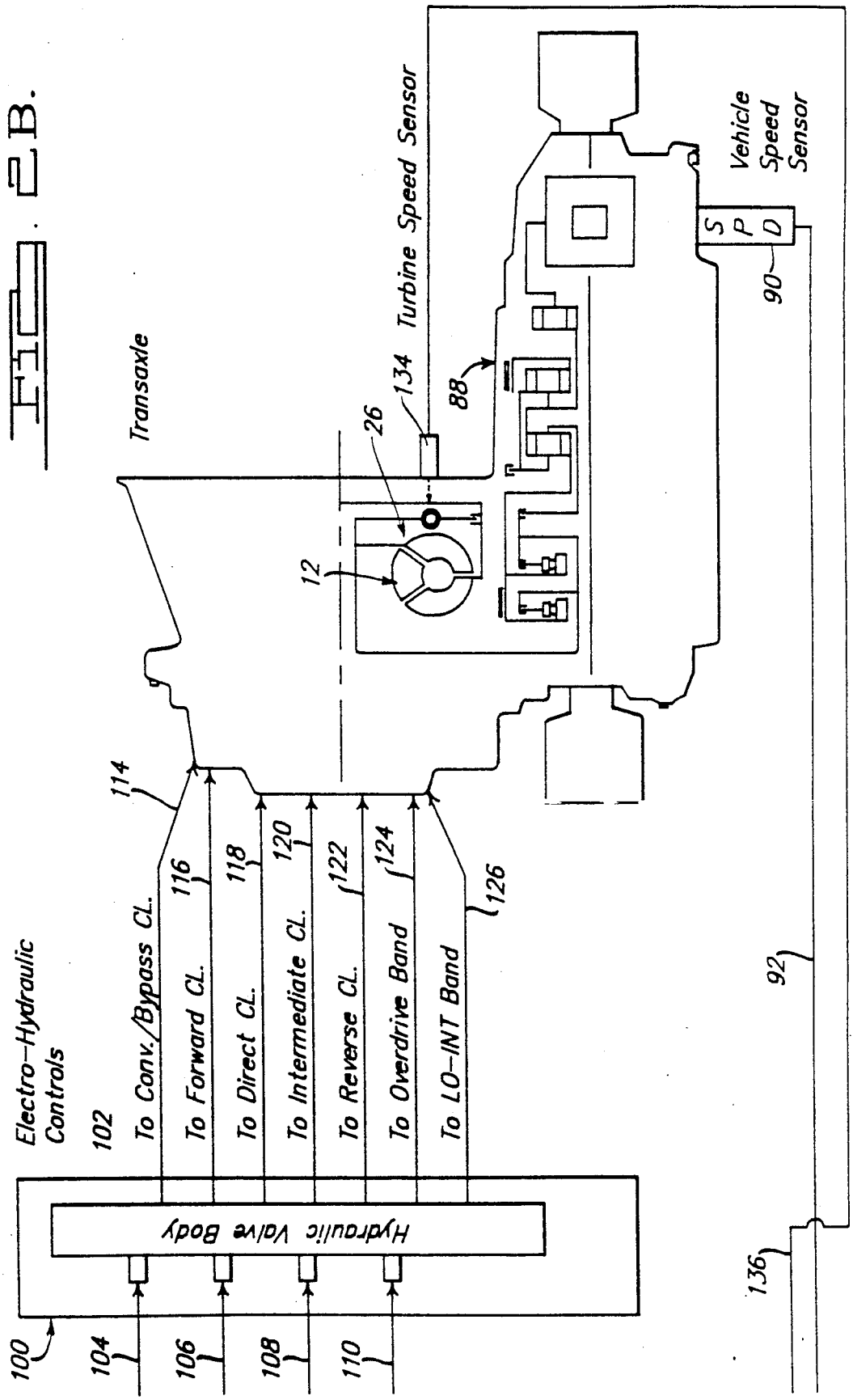

An automatic transmission that incorporates the lockup clutch is illustrated schematically in FIG. 2B at 88. Reference may be made to U.S. Pat. Nos. 4,633,738 (Timte) and 4,665,770 (Van Selous) for a particular description of transmission clutches and brakes that may be controlled by the control system described in this specification.

A vehicle speed sensor 90 measures or senses the speed of the driven element of the transmission 88 which is an indicator of the vehicle speed. That signal is delivered through line 92 to the processor 70.

The drive range for the transmission is selected by the vehicle operator by manual adjustment of an adjustment lever schematically shown at 94. The various ranges are reverse, neutral, drive. (D), direct drive ratio (3) and low speed ratio (1). Various shift patterns are established for the three forward drive ranges D, 3, and 1, depending upon the position that is selected by the vehicle operator. The position that is selected is sensed by the sensor and a position signal delivered through line 98 to the microprocessor 70.

The microprocessor 70 includes also a sub-system identified as loss-of-signal-hardware (LOS). This hardware is adapted to establish an appropriate control signal for the output driver circuit that will cause the hydraulic valve body to continue operating with limited function in the event of an electronic voltage failure in the system.

The electrohydraulic control valves are identified generally by reference character 100. They include a valve body 102 similar to that which is described in the aforesaid Timte and Van Selous patent disclosures of the '738 and '770 patents. The output signals of the processor 70 are delivered to the control valve body through a plurality of leads as shown at 104 through 110. Lead 104 carries a converter bypass signal which communicates with the PWM solenoid 64, which communicates with valve 44, which leads to passage 42 and chamber 46 as seen in FIG. 1. Lead 106 carries a control signal for a variable force salemaid pressure control. Leads 108 and 110 carry shift solenoid pressure signals for effecting ratio changes in the transmission. The aforementioned Timte and Van Selous diclosures of the '738 and '770 patents as well as the aforesaid Bolz disclosure of patent application Ser. No. 317,400 describe examples of shift solenoids and aforesaid TV pressure control solenoids.

The output signals of the electrohydraulic controls 100 are distributed to the transaxle 88 through control lines 116 through 126. Line 114 corresponds to control passage 42 shown in FIG. 1. It extends to the converter bypass clutch control chamber. Lines 116, 118, 120, and 122 extend, respectively, to the forward clutch, the direct clutch, the intermediate clutch and the reverse clutch for the transaxle 88. These clutches can be seen by referring to the aforesaid Timte and Van Selous patents. Lines 124 and 126 extend, respectively, to the overdrive brake band and to the low and intermediate brake band for the transaxle 88. These bands also can be seen by referring to the disclosure of the aforesaid Timte and Van Selous patents.

The control system block diagram of FIG. 3 illustrates the overall system that is used to establish a so called clutch engage mode. The different operating modes; including the engage mode, will be described subsequently with reference to FIGS. 7 and 8.

As seen in FIG. 3. the control logic 71 is embodied in the control module or CPU of the processor 70. The various signals that are received by the processor 70 are illustrated and these correspond to those described with reference to FIG. 2. As will be explained subsequently, the control logic 71 of the processor 70 calculates a desired slip, and that value is represented by a signal in line 128. The control software and electronics of FIG. 3 are incorporated into the control system.

For purposes of this specification, the software for the electronic control unit 70, exclusive of the peak-and-hold driver circuit 156, will be described in terms of hardware functions schematically illustrated in FIG. 3.

The system is effective to establish in the bypass clutch sufficient capacity to hold the desired slip at the current torque. Torque transients then are absorbed by momentary periods of increased slip as the controller establishes a new output signal for the solenoid corresponding to the new torque condition.

Numeral 130 designates the internal combustion engine, and numeral 132 designates an engine speed sensor which measures crankshaft speed. Transaxle or transmission 88 has a turbine speed sensor 134. The output signal of the turbine speed sensor 134 is sampled via signal flow control path 136 and input sampling switch 138 to the control logic 71 of the processor 70. The turbine speed signal is sampled also by a comparator register 140.

Engine speed measured by the sensor 132 is sampled via signal flow path 142 and input sampling switch 144 by the control logic of processor 70. That signal is sampled also by the compartor register 140.

The comparison at the register 140 determines whether there is any difference between the turbine speed and the engine speed. This value is called an actual slip, and the value of that actual slip is represented by a signal in lead 146, which is distributed to summing point 148. The difference between the value of the signal in lead 146 and the desired slip signal in lead 128 is measured by the register or summing point 148 to establish a slip error signal in line 150. This error signal is distributed to a proportional-integral-derivative controller logic portion of the processor 70 (PID controller shown at 152. This controller may be of a well known variety. It is inserted into the control loop to form a part of the forward gain of the control system. It effects proportional control, an integral control and a differential control. By adjusting the magnitude of these terms, the actual signal that is the output of the PID controller can be modified so as to produce the required system response.

The Proportional control feature of the PID controller makes it possible for the output of the controller to be varied directly with the slip error. It produces a so called gain factor, which is a measure of the control gain in the system that reduces accordingly the magnitude of any steady state errors. Because the proportional control by itself, of necessity, establishes a gain factor of limited range, it is not sufficient to achieve the desired response due to steady state errors or undesired slip oscillations. The integral control component of the PID controller eliminates steady state error for improved system accuracy. The response can further be improved to effect system stability and effective transient response of the system by introducing the derivative control. This introduces a stablizing effect on the system because of the addition of phase lead to the control loop.

For a discussion of PID controllers of this kind, reference may be made to a text entitled "Feedback and Control Systems", by A. C. McDonald and H. Lowe, published by the Reston Publishing Company, Incorporated, of Reston, Virginia 22090 in 1981.

The output of the PID controller is a duty cycle signal that follows signal path 154. This is received by a peak-and-hold driver circuit 156 for the pulse width modulated solenoid 158, the latter being connected to the driver circuit 156 through line 104.

Although we have described in this specification a PWM solenoid, it is contemplated that the system could be adapted to use instead a variable force solenoid (VFS).

Figure 4A:
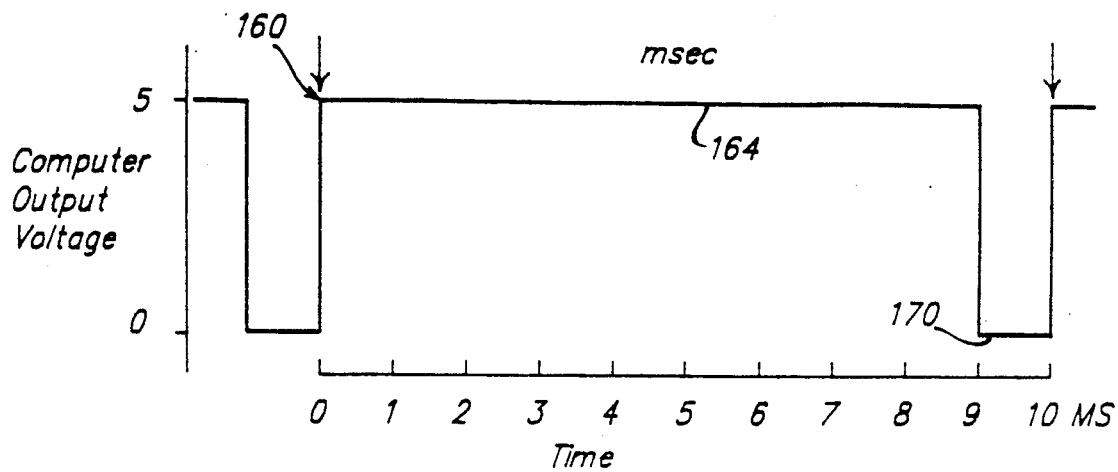
FIGS. 4A and 4B show the relationship of solenoid current and computer output voltage for the solenoid with respect to time.
Figure 4B:
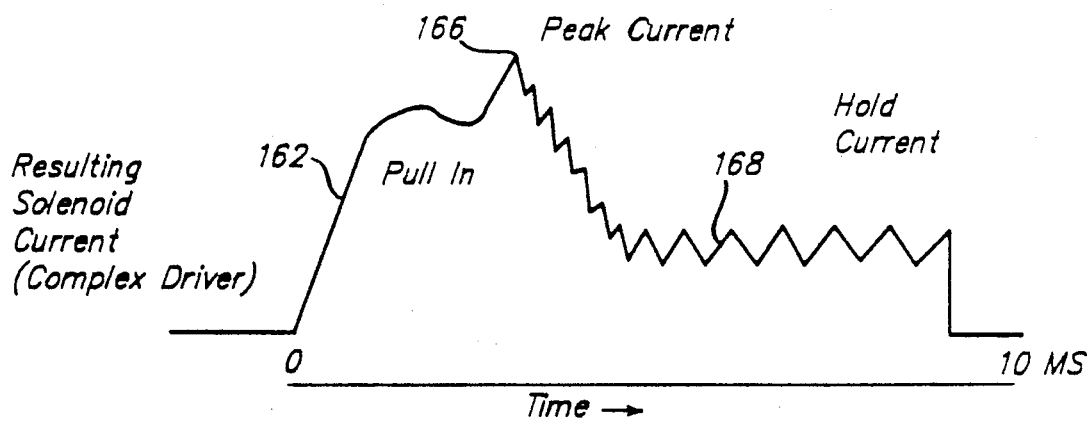

The peak-and-hold circuit for the PWM solenoid may be of a conventional type. It is effective to establish at the input side of the solenoid a driver voltage similar to that shown in FIG. 4B upon receipt of a signal from the PID controller. As shown in FIG. 4A at 160, the peak-and-hold circuit establishes a change in the solenoid input represented by the steep slope portion 162 of the curve in FIG. 4B. During the initial part of the hold time during which the controller output voltage is established at a value shown at 164, a peak current is established by the driver as shown at 166. This overcomes the initial friction and inertia of the solenoid (pull-in). That event is followed by a moderate hold current value as shown at 168 until the termination of the duty cycle on-time at 170. The cycle is repeated again in the next duty cycle period.

The output of the solenoid valve 158, which would correspond to the solenoid valve 64 of FIG. 1, is distributed to the bypass clutch control valve 44 described with reference to FIG. 1. The output of the bypass clutch control valve is a pressure signal in passage 42 which, as explained with reference to FIG. 1, communicates with control pressure chamber 46 for the converter bypass clutch 26.

SEQUENCE OF CONTROLLER OPERATION

Figure 5:
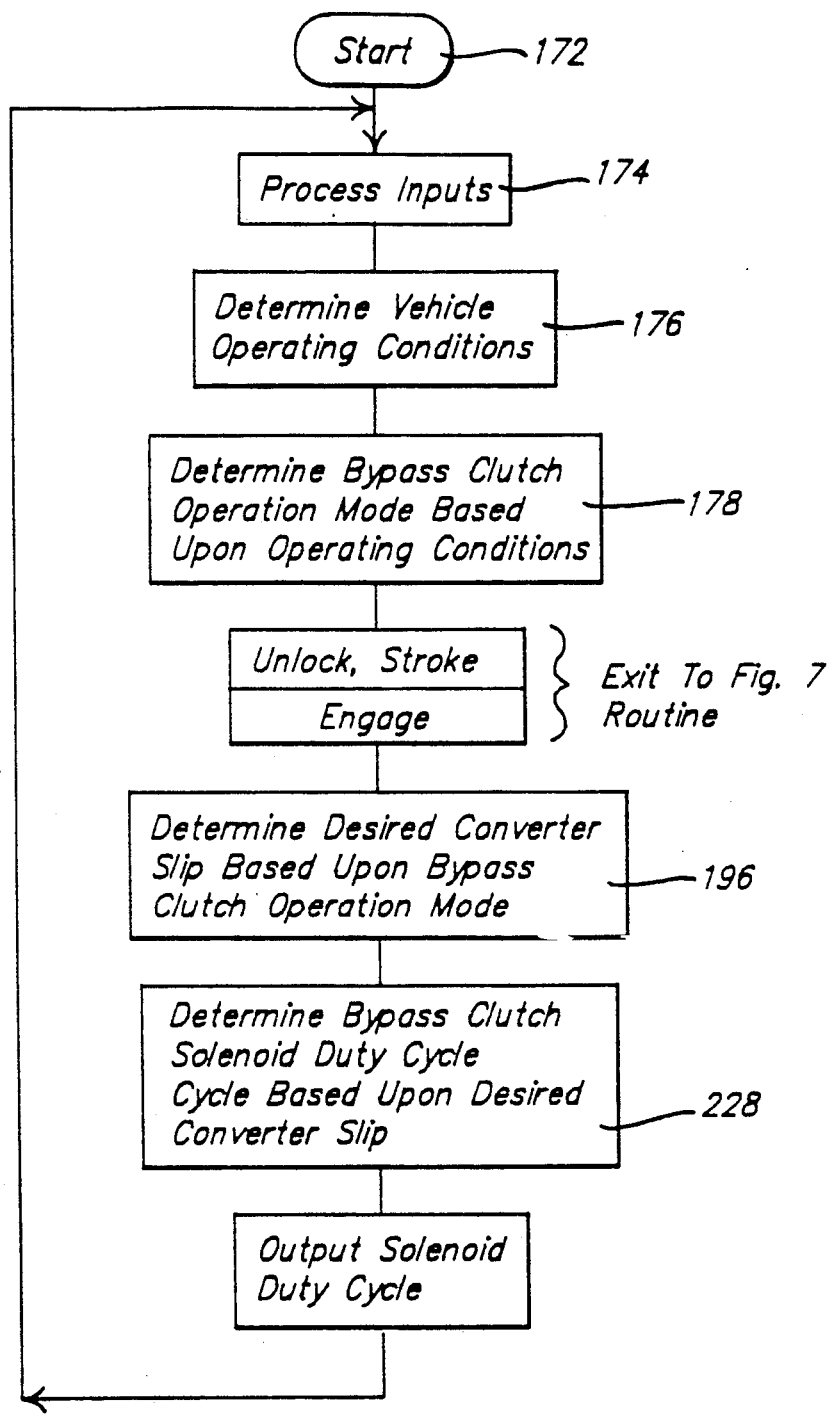
FIG. 5 is a block diagram describing the sequence of events for the system during clutch controller operation.

If the controller used to control the transmission is used also to control the vehicle engine, the background control loop would include various stages, only one of which would include the stages illustrated in FIG. 5. The sequence would exit from the main control loop and perform the control stages of FIG. 5 in a sub-routine. For example, following initialization of the controller, the inputs are read from the various engine and vehicle condition sensors. In a subsequent stage the various system equations and data stored in memory are used to establish various control functions for the engine and transmission including the setting of the idle speed, the setting of the rate of fuel delivery by the engine injection system, the setting of the spark advance, and so forth. Following those stages the sequence of operations shown schematically in the flow diagram of FIG. 5 would take place.

As part of the sub-routine of FIG. 5, the various shift control functions would be set as well as the control pressure.

If the controller is dedicated solely to the control of the transmission rather than the driveline as a whole, the overall background loop would appear in the form illustrated in FIG. 5. Following the initialization at the start of the sequence at stage 172, the controller will read and process the input signals from the various sensors that control the transmission. This occurs at stage 174. Those sensor inputs are the engine speed, the input shaft speed or turbine shaft speed, vehicle speed and throttle position as well as the gear shift selector lever position, oil temperature and the brake on-off condition. Based on that sensor information the operating conditions for the torque converter are calculated to determine the actual converter slip speed and the converter speed ratio. The actual converter slip speed is equal to engine RPM minus turbine shaft RPM and the converter speed ratio is equal to turbine shaft speed divided by engine speed. These calculations occur at stage 176.

Following operating stage 176 of the control cycle the controller determines the required bypass clutch operation mode based on the operating conditions that are determined at stage 176. This occurs at stage 178 in FIG. 5. The operating modes for the clutch are the unlock mode, the stroke mode and the engage mode. If the unlock mode is called for, an open converter condition is in effect and the calculation of a desired slip is not applicable. The same is true for the stroke mode, which occurs at an instant prior to the engage mode following operation of the converter as an open converter. Again desired slip is not applicable. If the determination that occurs at stage 178 indicates that the engage mode is called for based upon the operating conditions that exist during any one background pass, the bypass clutch loop is closed and desired slip is calculated based upon actual converter slip and a final target value for the slip. This will be described subsequently.

The determination of the bypass clutch operating mode is best described with reference to FIG. 7. If the operating conditions indicate that the bypass clutch should operate in the unlock mode indicated at stage 180 in FIG. 7, then an inquiry is made by the controller to determine whether the vehicle speed is greater than five miles per hour and if the transmission selector is in the drive range or the overdrive range. This inquiry occurs at stage 182. If the answer to that inquiry is negative, the procedure does not advance and the flag that would cause a jump from stage 182 to a subsequent stage does not change. The operating sequence then would cause the controller to remain in the unlock mode stage 180 and continue inquiry 182. If the answer to inquiry 182 is positive, the unlock flag is cleared and the stroke mode flag is set thus advancing the sequence to stage 184.

Having entered stage 184 an inquiry is made at stage number 186 with respect to whether the speed of the vehicle is less than five miles per hour or if the selector lever chosen by the operator is in the drive or the overdrive position. If the answer to that inquiry is positive, the unlock flag is set and the stroke mode flag is cleared. Thus the sequence returns again to the unlock mode stage 180. On the other hand if the inquiry at stage 186 is negative, the flags do not change, and the sequence advances to stage 188 where a further inquiry is made with respect to whether the throttle position is greater than 4% open, whether the vehicle is not downshifting and whether the converter speed ratio is greater than a predetermined throttle function. If the answer to that inquiry is negative, the flags do not change and the operating sequence then remains in the stroke mode 184 and continues with inquiries 186 and 188. That subroutine is followed over and over as the controller control loops are repeated until the inquiry at stage 188 is positive. At that time the stroke mode flag is cleared and the engage mode flag is set. The engage mode stage is indicated at 190.

Upon reaching the engage mode stage at 190 a further inquiry is made at stage 192 with respect to whether the transmission is downshifting or if the throttle position is less than 2% open. If the answer to that inquiry is positive, the stroke mode flag is set and the engage mode flag is cleared. The subroutine then returns to the stroke mode. That subroutine is repeated for each background loop until the operating conditions permit a negative answer to the inquiry at 192. If that is the case the flags for the stroke and engage modes do not change and the sequence proceeds to stage 194 where a further inquiry is made with respect to whether the speed of the vehicle is less than five miles per hour, and whether the operator has positioned the selector lever in the drive range or the overdrive range. If the answer to that inquiry is positive, the unlock flag is set and the sequence returns to the beginning stage at 180. Likewise the engage mode flag is cleared. On the other hand if the inquiry at stage 194 is negative, the flags do not change and the sequence remains in the engage mode at 190 and proceeds, during each background pass, to repeat the two inquiries at 192 and 194 until the result of the inquiry at 194 becomes positive and the unlock flag becomes set.

Figure 7:
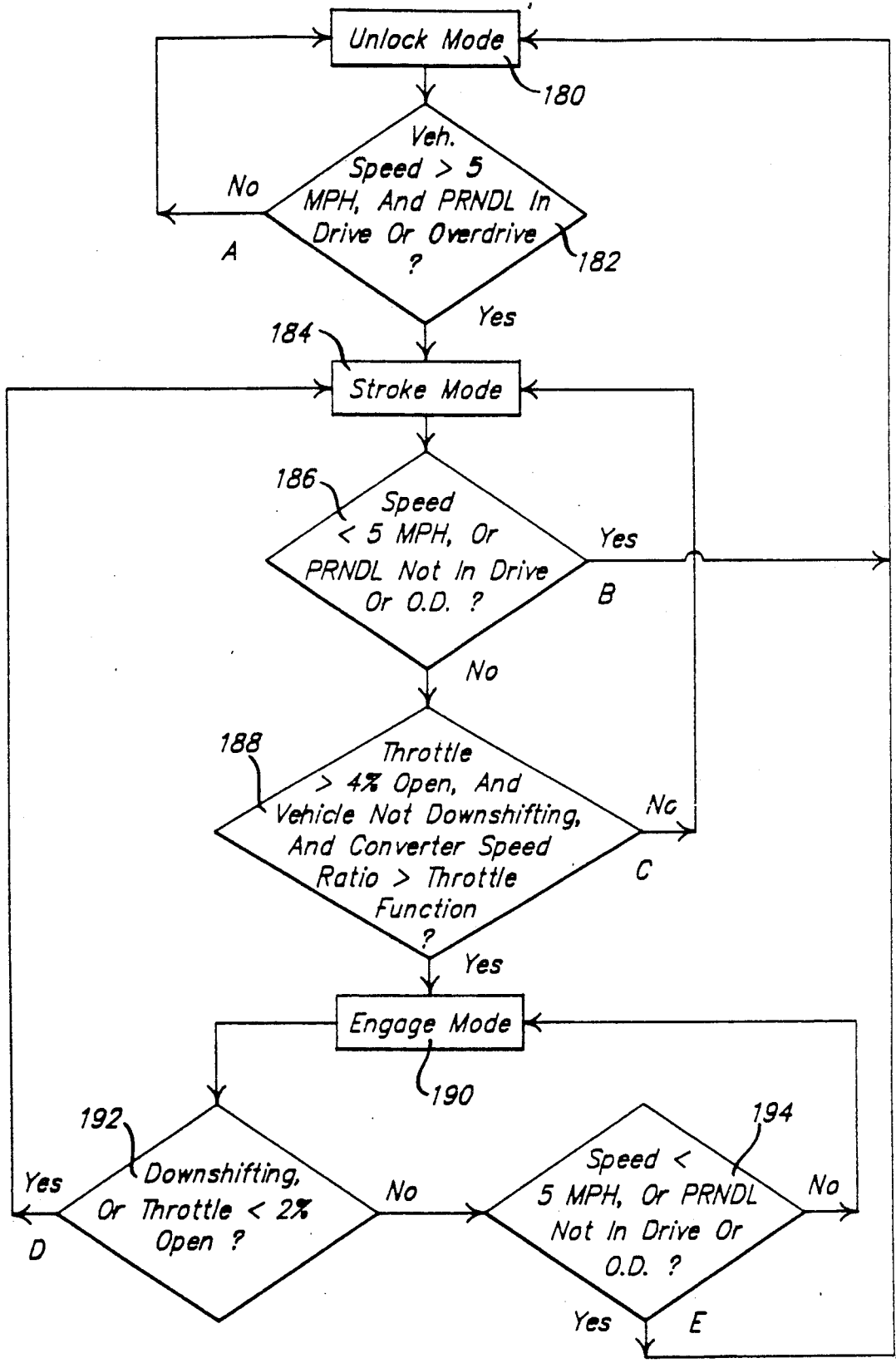
FIG. 7 is a flow diagram showing the sequence of operation of the clutch during the clutch operation mode.
Figure 7A:
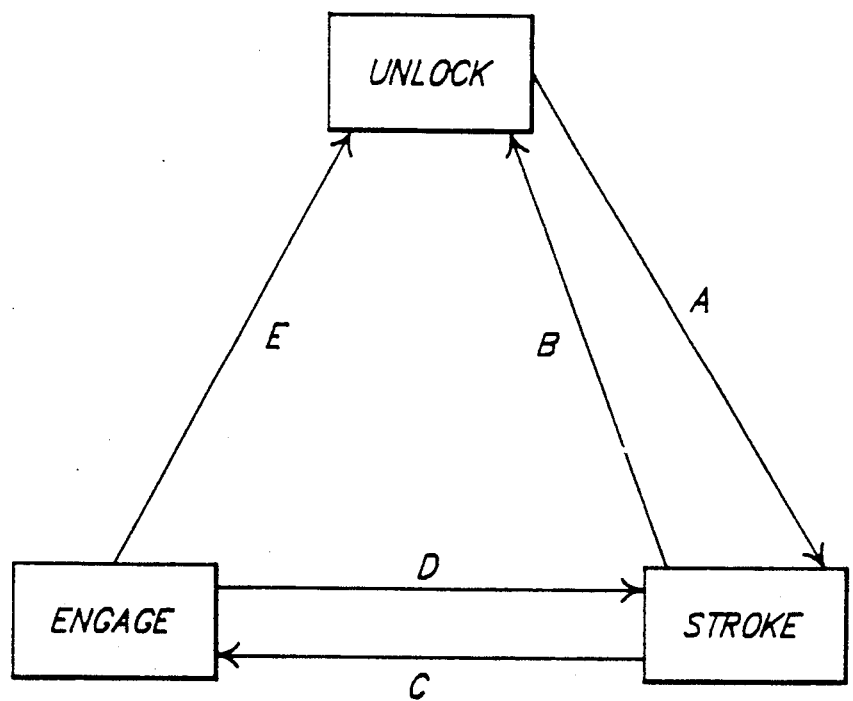
FIG. 7A is a schematic diagram showing the relationship between the three clutch modes; eg., the unlock mode, the stroke mode and the engage mode.
Figure 8:
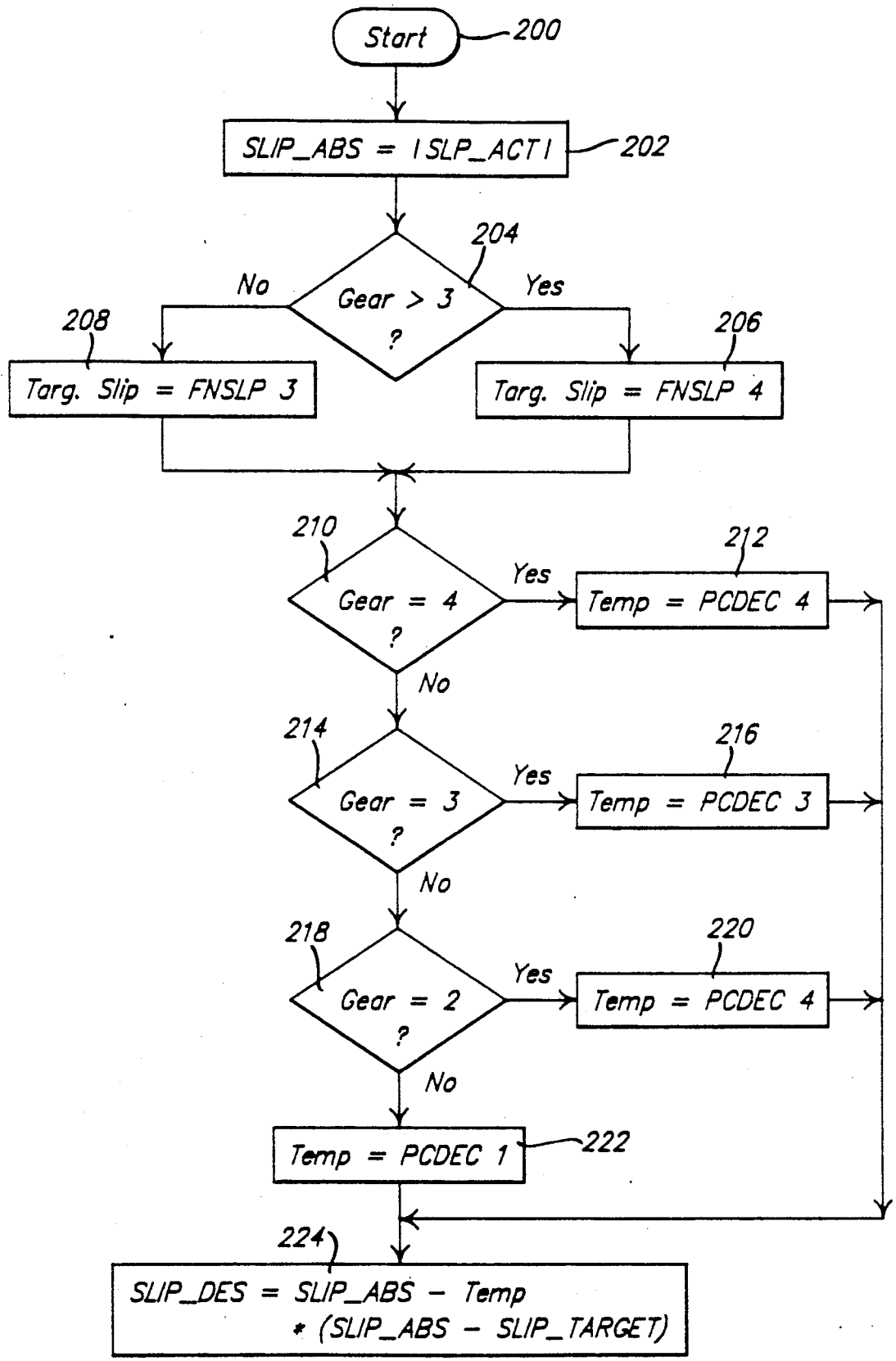

FIG. 7A is a block diagram that shows the sequence described in the foregoing description of the bypass clutch operating modes. For purposes of understanding the block diagram FIG. 7A, the transition paths from one mode to another have been labelled by the symbols A, B, C, D, and E. The corresponding points on the flowchart of FIG. 7 are identified by identical reference labels so the block diagram of FIG. 7A can be correlated to the flow chart of FIG. 7.

FIG. 7A shows the three clutch operating modes; i.e., the unlock mode, the stroke mode and the engage mode. It is possible for a transition to occur from the unlock mode only to the stroke mode along path A. The control sequence having reached the stroke mode stage, it is possible for either of two events to occur. In the first place, the sequence can return to the unlock mode along path B; or if conditions permit, the engage mode can be entered along path C.

The sequence having entered the engage mode, again either one of two events can occur. In the first instance the engage mode can be terminated and the stroke mode reinstituted along the transition path D. On the other hand, if an unlock mode is called, a transition is made from the engage mode to the unlock mode along transition path E to the unlock mode.

Returning to FIG. 5, the sequence previously described with reference to FIG. 7 is illustrated in the flow chart as an exit routine outside the main sequence. If the sequence of FIG. 7 reaches the engage mode stage 190, the routine returns to the next stage 196, as shown in FIG. 5, where a determination is made of the desired converter slip based upon the clutch operation mode.

The calculation that occurs at stage 196 makes use of information that is stored in the processor memory registers. These registers, for each background loop, have stored in them an actual slip value which is equal to the actual converter slip measured as previously described. It has stored in it also an absolute converter slip, which is an absolute value of the actual converter slip.

The controller, when the sequence is in the engage mode, determines a so called desired slip and stores that value in memory where it can be fetched for a determination subsequently of the bypass clutch solenoid duty cycle. The desired slip is equal to the actual slip, measured as previously described, minus a percentage of the difference between the actual slip and the target slip.

Figure 9:
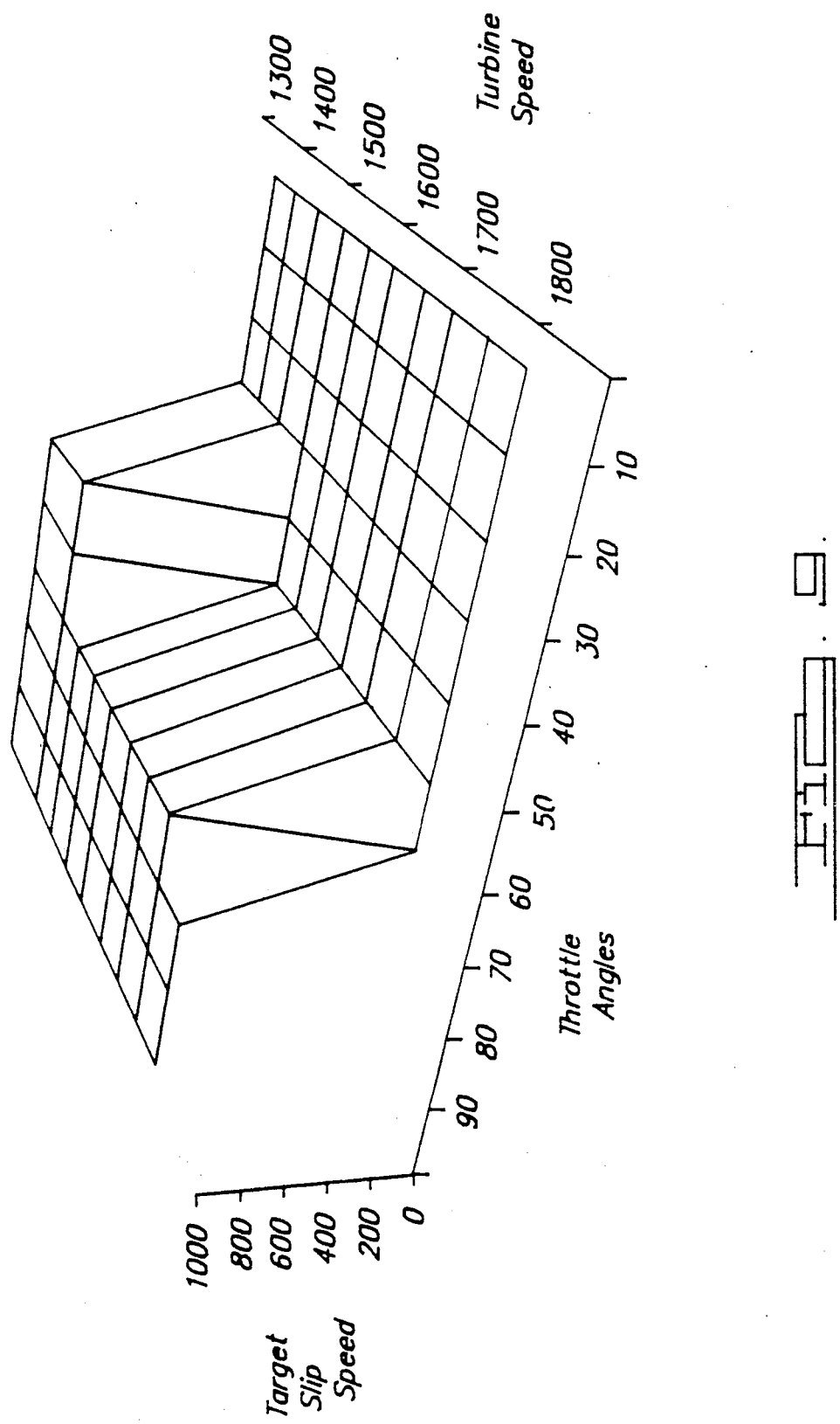
FIG. 9 is a plot in three dimensions showing a table for the variables that are stored in memory and that are addressed by the controller to effect modulated clutch application.
Figure 9A:
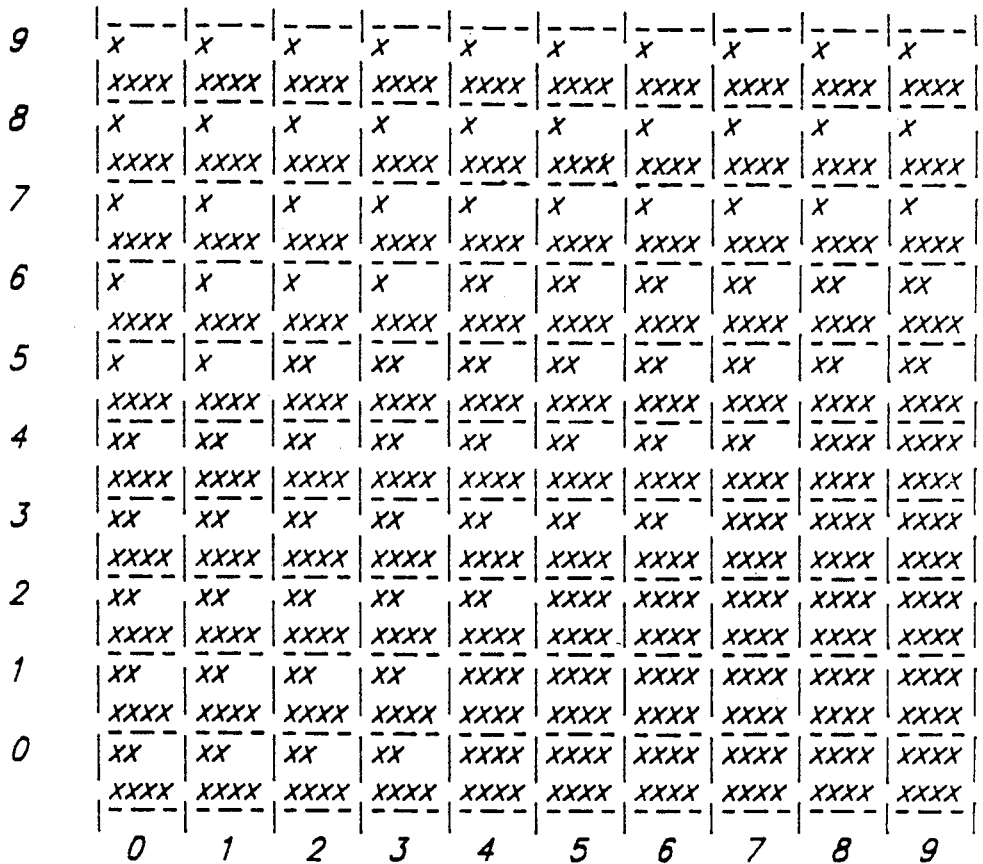
FIG. 9A is a table that shows the relationship between the normalized throttle position of the engine with respect to normalized turbine speed whereby a target slip may be selected depending upon vehicle operating conditions.

Other registers store the current slip error, the error that was calculated during the previous background loop and the error that was calculated during the second previous background loop. In order to determine this actual or current error it is necessary to use other information stored in memory that is a measure of a target slip for each gear ratio. The target slip information that is stored in memory for each gear ratio is shown in the chart of FIG. 9 where there is plotted on three dimensional axes a target slip value for each throttle angle and turbine speed value. FIG. 9A shows a table of data, charted in FIG. 9, in a two dimensional plot. For each normalized throttle position on the horizontal axis and for each normalized turbine speed value on the vertical axis, a target slip value may be read or interpolated. The upper "x" symbol in each section of FIG. 9A represents a slip value and the lower "x" symbol represents the address of the memory register where that slip value is stored. A throttle position/rpm value that falls between two locations in FIG. 9A calls for an interpolation by the processor.

Figure 8:
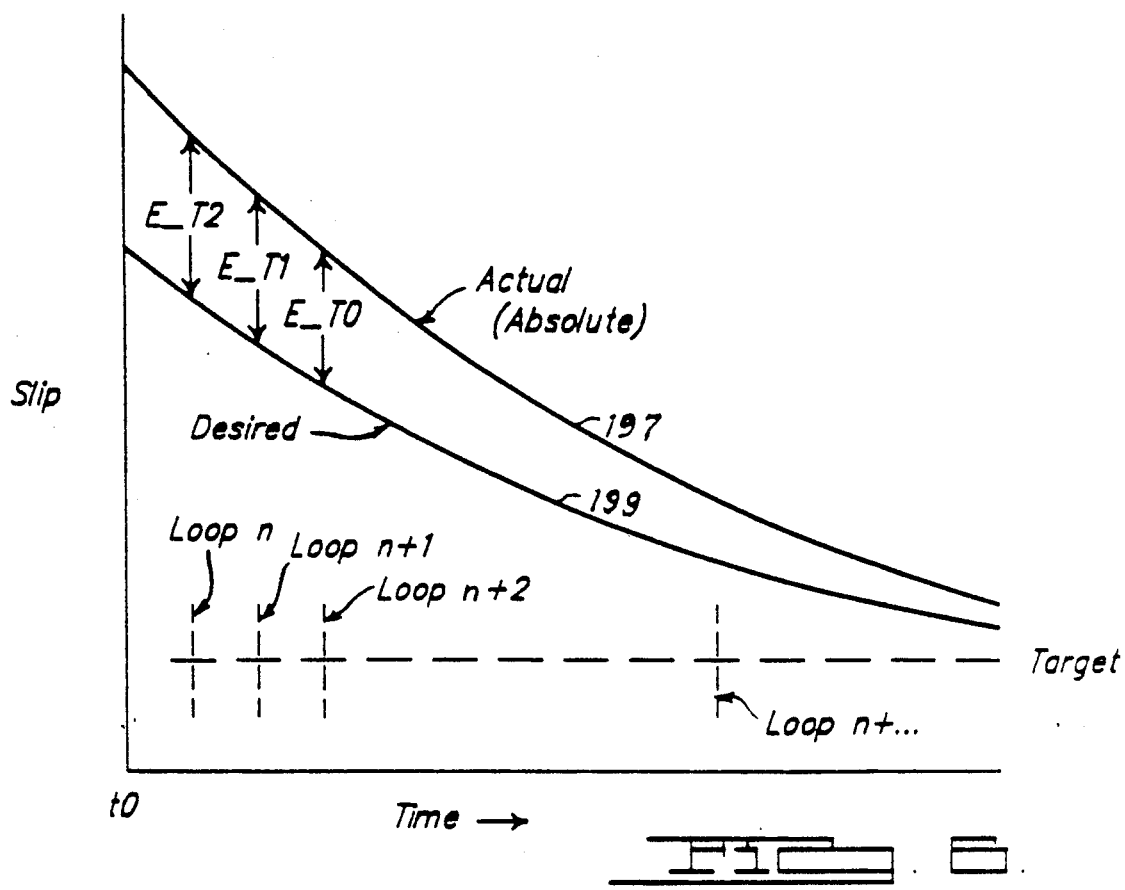
FIG. 8 is a flow diagram that describes the strategy used by the controller to effect modulated converter clutch application during the engage mode.
Figure 8A:
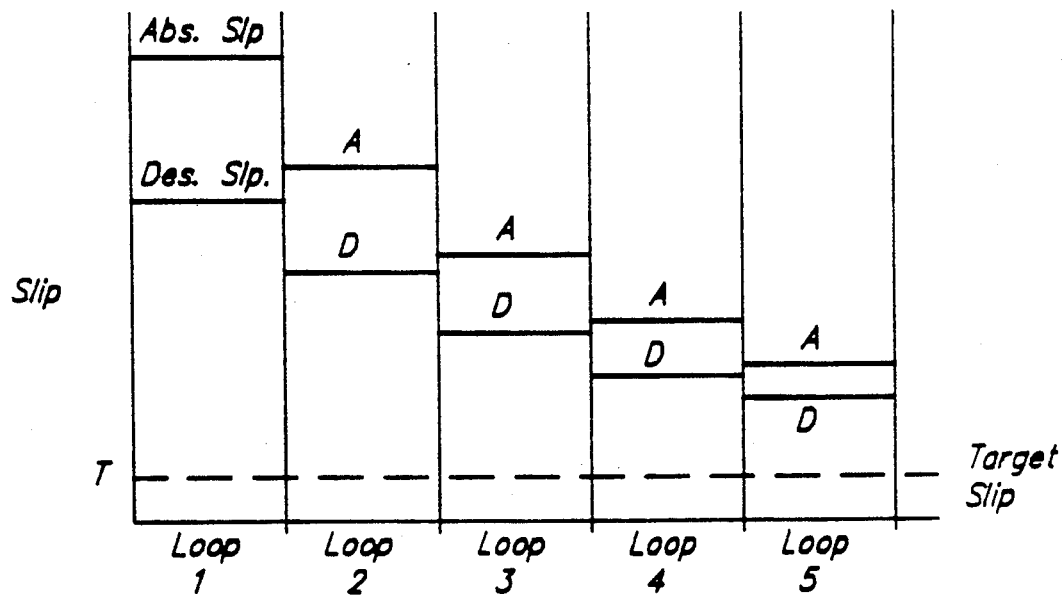

FIG. 8 shows the control stategy in flow chart form for determining desired slip, as will be explained below.

During the process of determining desired slip the first step includes setting the absolute slip equal to the absolute value for converter slip. The processor then sequences through the next succeeding stages in FIG. 8 and determines which gear ratio is in place. If the gear ratio is greater than that corresponding to third gear, a command is issued to look at the table of FIG. 9A to determine the proper target slip. That value, after having been fetched, is placed in the target slip register where it can be used for the purpose of determining desired slip using the equation:

Desired slip = Actual slip - (PCDEC "x")*(Actual slip - Target slip), where PCDEC "x" is the value that appears at 212, 216 or 220.

Referring next to FIG. 6, a plot is made of the slip versus time. Curve 197 is a plot showing the actual slip versus time and plot 198 shows the desired slip versus time. Plot 199 is a result of the calculation described above using the three error values described previously; i.e., the error (E0) currently measured by the slip controller, the error (El) determined in the previous background loop and the error (E2) determined in the second previous background loop. These error values also are indicated in FIG. 6.

In FIG. 6 the target slip is indicated by the symbol T. The value of that target slip, as mentioned previously, will be determined by the throttle angle and turbine speed that exist for any particular gear ratio. 25 As mentioned previously that information is obtained from table 9A.

As seen in FIG. 6, the desired slip is calculated for each background loop so that the value of the absolute slip approaches asymptotically the value of the target slip.

FIG. 6A shows the same information as FIG. 6, although the information is illustrated in graphic form where the line A represents absolute slip and the line D represents the value of desired sliP for successive background loops. As seen from FIGS. 6A, the value of A approaches the target slip value as the background loops are repeated.

The procedure used to establish desired slip, is graphically illustrated in the flow chart in FIG. 8. The routine begins at stage 200. At stage 202 the value of the absolute slip is determined based upon the actual slip value. Having established an absolute slip value, the procedure proceeds to stage 204 where an inquiry is made with respect to the gear ratio that is determined by the gear ratio sensor. If the gear ratio is greater than the third ratio, the sequence proceeds to stage 206. If the ratio is the fourth ratio at that time the appropriate stored value of the target slip in FIGS. 9 or 9A is read from memory. On the other hand if the gear ratio is that corresponding to third gear, another target value is read at stage 208. That occurs if the inquiry at stage 204 is negative. In either case the routine will proceed to stage 210, where an inquiry is made with respect to the gear ratio in place.

If the gear ratio is that corresponding to fourth gear, the slip reduction factor PCDEC4 is stored in the temporary storage register as shown at stage 212. If the inquiry at stage 210 is negative, the routine proceeds to stage 214 where another inquiry is made to determine whether the gear ratio is that corresponding to third gear. If the answer to that inquiry is positive, slip reduction factor PCDEC3 corresponding to that gear ratio is fetched from memory and stored in the temporary storage register as shown at stage 216. If the inquiry at stage 214 is negative, the routine proceeds to stage 218 where a determination is made as to whether the gear ratio is that corresponding to second gear. If the answer to that inquiry is positive, a temporary holding register receives still another slip reduction factor PCDEC3 from memory. That stage is indicated at 220. If the inquiry at 218 is negative, the routine proceeds to stage 222 which causes the temporary holding register to receive a new data item (PCDEC1) from memory.

The routine then passes to the final stage 224 where a desired slip calculation takes place using the temporary register data in the formula previously described. In other words desired slip is equal to the absolute slip minus a percent of the difference of the absolute slip and the target slip for the particular background loop in place. At the end of each background loop the previous error E2 is set equal to E1 and the previous error El is set equal to E2 as the error E0 is set equal to the absolute slip minus the desired slip. This updates the information for each background loop so that a new error can be calculated for the next loop.

CALCULATION OF DUTY CYCLE

Returning again to FIG. 5 it is seen that the desired slip and its calculation as described in the previous paragraphs occurs at stage 196. After that occurs the clutch solenoid duty cycle is determined at stage 228. That duty cycle is determined using the desired converter slip calculated in stage 196.

If the system is in the unlock mode, the duty cycle is zero. If the system is in the stroke mode, the duty cycle is adjusted as a function of the throttle position to provide a sufficient hydraulic pressure such that the clutch will continue to be disengaged, but such that any additional pressure will cause the clutch to engage. Thus the clutch is maintained at a so-called incipient engaged (stroked) position.

During the engage mode, however, the duty cycle calculation, using a closed loop technique, provides the incremental gain PID controller with information to adjust the pulse width modulated duty cycle to obtain the desired slip. This procedure starts with the absolute PID formulas:

Output new = $K_p(E0) + K_d(E0-E1) / T0 + K_i(E0*T0 + E1*T1 ... + En*Tn)$

Output old = $K_p(E1) + K_d(E1-E2) / T1 + K_i(E1*T1 + E2*T2 ... + En*Tn)$

In the equations above E0 is the current error, E1 is the previous error and E2 is the second previous error. T0 is the time of the present control loop between the current and previous error readings. T1 is the time interval between the previous and the second previous error readings. T2 is the time interval between two successive earlier error readings. The constant $K_p$ is a proportional gain constant, the constant $K_d$ is a derivative gain constant and the constant $K_i$ is the integral gain constant. The output change equals the output-new formula minus the output-old formula. That value is computed in accordance with the following formula:

Output-change formula = $K_p(E0 - E1) +$ $K_d[(E0 - E1)/T0 - (E2 - E1)/T1] + K_i*E0*T0$

OVERALL SUMMARY OF THE CONTROL FUNCTIONS

During closed loop control, when the controller is in the engage mode, the converter slip is calculated using engine RPM and transmission input speed or turbine speed. That slip is compared to the desired slip. In order to determine the error signal, the controller routine then adjusts the solenoid duty cycle to minimize the slip error in accordance with the chart of FIG. 6.

Control strategy is broken down into two basic parts. At the outset there is a determination of the operating mode. The mode that is selected is one of three modes; i.e., the unlock mode, the stroke mode and the engage mode. The unlock mode is called for when the gear selector lever is not in the drive or overdrive position, or when the vehicle is not moving at a speed greater than the minimum value such as five miles per hour, or the throttle position is at a or near wide open setting, or the transmission oil temperature is low or the brake is applied.

The stroke mode is allowed when the unlock mode is not required and the conditions to engage are not met. For example, the stroke mode is not allowed when the transmission is downshifting or when the throttle opening falls below a throttle position versus vehicle speed function that is predetermined. That function prevents engagement during coast conditions.

The engage mode is allowed when the unlock or stroke modes are not required and the converter speed ratio is confirmed to be operating above a speed ratio versus throttle position function that is predetermined. That function is established at a value that will prevent the bypass clutch engagement from adversely affecting vehicle performance.

During the unlock mode no duty cycle is output to the pusle width modulated solenoid. During the stroke mode the pulse width modulated solenoid duty cycle is determined by throttle position using a duty cycle versus throttle position function. This function is calibrated to provide stroke pressure to the bypass clutch. Stroke pressure is that amount which does not reduce slip, but the value is slightly below the value at which slip would begin to be reduced. The stroke mode is used to prepare for a smooth transition into the engage mode and into the closed loop control.

The engage mode uses a PID controller to minimize slip error. The controller determines error by comparing the actual slip to desired slip. Rapid torque changes will result in eventual compensation of duty cYcle, but will allow rapid torque changes to be absorbed by short periods of increased slip, or decreased slip, as the case may be, without being felt by the driver. The value for the desired slip is determined based upon the actual slip and a final target value and subtracting from the actual slip a percentage of the difference between the actual slip and the first target slip.

Use of the above formula results in an exponentially decaying slip that approaches the final target slip. The percentage factor in the formula determines how quickly the final slip target is attained. It may vary depending upon the transmission gear. The values for target slip are calibrated and are stored in memory for access by the controller during the engage mode. The final target slip is in the form of slip tables of throttle position versus turbine speed. These values, which are addressable, are calibrated to avoid pulling the engine speed below its lugging limit and to provide enough slip to absorb engine RPM fluctuations not isolated by the converter damper.

The input to the solenoid driver circuit is the output of a PID controller, which uses the logic of the engage mode routine. It uses the current slip error, the previous slip error and the error of two previous loops to determine the required change in the duty cycle for each background loop of the controller.

Having described a preferred embodiment of our invention, what we claim and desire to secure by U.S. Letters Patents is:

1. A fluid pressure operated clutch assembly comprising:
   a driving member, a driven member, each member having a friction surface thereon engagable by the other;
   fluid pressure operated clutch actuator means for frictionally connecting said driving and driven members;
   a pressure source, passage means defined in part by a clutch control valve for distributing control pressure to said actuator means;
   electronically operated valve means for establishing a clutch control valve actuating pressure;
   an electronic processor means for varying said actuating pressure according to variations in operating conditions including torque delivered by said clutch assembly and speed of one or said members;
   said processor means including means for storing a target slip for said clutch assembly for each set of values of said operating conditions, and means for determining a desired slip of said clutch assembly for said set of values by measuring actual slip and subtracting a percentage of the difference between said actual slip and said target slip.

2. In a bypass clutch for a hydrokinetic torque converter for an automatic transmission and engine;
   a clutch member connected to said engine, a converter having a friction surface adapted to cooperate frictionally with said clutch member;
   a fluid pressure operated means for controlling the clutching capacity of said bypass clutch whereby clutch slip may be effected for a variety of engine and transmission conditions,
   electronically operated valve means for controlling the pressure applied to said fluid pressure operated means, said valve means being connected to and being responsive to an electronic processor having control logic that responds to changes in operating conditions of said transmission and engine;
   said control logic determining a desired slip for each set of values for at least two operating conditions of said transmission;
   means for determining a target slip for each set of said operating conditions;
   means for determining the actual slip of said bypass clutch;
   means for determining the desired slip for said bypass clutch for each operating condition of said transmission; and
   means for effecting a decay of the actual slip over time by calculating a value for slip that is a function of the difference between the actual slip and the target slip for each set of said operating conditions.

3. A torque converter bypass clutch assembly comprising a clutch plate, an impeller housing enclosing a turbine and an impeller, said clutch plate defining with said impeller housing a control pressure chamber, said plate being actuated by fluid pressure within said impeller housing with the pressure in said pressure chamber opposing the fluid pressure actuating said plate;

valve means for controlling said control pressure in accordance with variations in impeller torque and turbine speed whereby a controlled slip of said clutch is achieved;

means for determining a target slip of said clutch for each set of turbine speed and impeller torque values;

means for determining a desired slip for each set of said values; and means for effecting a decay in the actual slip of said clutch toward said target slip in accordance with a percentage of the difference between said actual slip and said target slip.

4. In a friction bypass clutch assembly for a hydrokinetic torque converter comprising an impeller, a turbine and an impeller shell enclosing said impeller and said turbine, an engine being connected to said impeller shell;

a clutch plate within said impeller shell connected to said turbine, said clutch plate defining with said shell a control pressure chamber;

control passage means communicating with said control pressure chamber for distributing a clutch capacity determining control pressure to said chamber, bypass clutch control valve means communicating with said control pressure means, bypass clutch solenoid valve means communicating with said clutch control valve means;

electronic processor means for establishing a voltage signal for said solenoid valve means including means for sensing engine torque, means for sensing turbine speed, means for establishing a desired slip of said clutch based upon the engine torque and turbine speed values, means for measuring the actual slip of said clutch, means for determining slip error, and means for establishing a control signal that is established as a function of a first constant proportional to slip error and a second constant that is determined by a derivative of said error;

and means for subjecting said solenoid valve means to the control signal of said control signal establishing means.

5. The combination as set forth in claim 4 wherein said processor includes means for determining slip values in repetitive sequence and means for calculating a target slip for each control sequence, said desired slip being equal to the actual slip minus a predetermined percentage of the difference between said actual slip and said target slip.

6. A method for controlling the capacity of a pressure controlled torque converter bypass clutch for a transmission torque converter having a turbine and an impeller the impeller being connected to an engine, said method comprising the steps of:

measuring turbine speed to establish a turbine speed signal and establishing a torque signal proportional to engine torque, measuring actual slip across said clutch, calculating a desired slip for each set of values of said torque signal and said turbine speed value, determining a slip error that is equal to the difference between said actual slip and said desired slip, and varying the capacity of said clutch in accordance with variations in the magnitude of said slip error whereby the slip of said clutch for any given engine torque and turbine speed is decayed toward a target slip, the latter being a predetermined value.

7. The method set forth in claim 6 wherein said desired slip equals actual slip minus a percentage of the difference between said actual slip and said target slip.

8. The invention as set forth in claim 6 wherein the method comprises calculating a table of values for target slip as a function of said turbine speed signal and said torque signal, said table being stored for retrieval during repetitive clutch control sequences, said slip error being determined during each clutch control sequence.

9. The invention as set forth in claim 7 wherein the method comprises calculating a table of values for target slip as a function of said turbine speed signal and said torque signal, said table being stored for retrieval during repetitive clutch control sequences, said slip error being determined during each clutch control sequence.

10. A fluid pressure operated clutch assembly for a multiple speed ratio power transmission mechanism comprising:

a driving member, a driven member, each member having a friction surface thereon engagable by the other;

fluid pressure operated clutch actuator means for frictionally connection said driving and driven members;

a pressure source, passage means defined in part by a clutch control valve for distributing control pressure to said actuator means;

electronically operated valve means for establishing a clutch control valve actuating pressure;

an electronic processor means for varying said actuating pressure according to variations in operating conditions including torque delivered by said clutch assembly and speed of one of said members;

said processor means including means for storing a target slip for said clutch assembly for each set of values of said operating conditions, and means for determining a desired slip of said clutch assembly for said set of values by measuring actual slip and subtracting the difference between said actual slip and said target slip multiplied by a slip reduction factor less than unity whereby a controlled decay of the actual slip over time is calculated.

11. The combination as set forth in claim 10 wherein said processor includes means for determining slip values in repetitive sequence and means for calculating a target slip for each control sequence, said desired slip being equal to the actual slip minus the difference between said actual slip and said target slip multiplied by a slip reduction factor less than unity.

12. The combination as set forth in claim 10 wherein said processor means includes means for detecting the speed ratio of said transmission mechanism and means for storing a separate slip reduction factor in a memory holding register for each of said speed ratios whereby said decay occurs at a rate that is dependent upon the existing speed ratio.

13. The combination as set forth in claim 11 wherein said processor means includes means for detecting the speed ratio of said transmission mechanism and means for storing a separate slip reduction factor in a memory holding register for each of said speed ratios whereby said decay occurs at a rate that is dependent upon the existing speed ratio.

14. A fluid pressure operated clutch assembly comprising:

a driving member, a driven member, each member having a friction surface thereon engagable by the other;

fluid pressure operated clutch actuator means for frictionally connecting said driving and driven members;

a pressure source, passage means defined in part by a clutch control valve for distributing control pressure to said actuator means;

electronically operated valve means for establishing a clutch control valve actuating pressure;

an electronic processor means for varying said actuating pressure according to variations in operating conditions including torque delivered by said clutch assembly and speed of one of said members;

said processor including means for establishing a stroke mode pressure to actuate said clutch to a pre-engaged condition whereby further pressure increase will cause clutch engagement, means for storing a target slip for said clutch assembly for each set of values of said operating conditions, and means for determining a desired slip of said clutch assembly for said set of values by measuring actual slip and subtracting a percentage of the difference between said actual slip and said target slip during operation in a clutch engage mode.

15. In a bypass clutch for a hydrokinetic torque converter for an automatic transmission and engine;

a clutch member connected to said engine, a converter having a friction surface adapted to cooperate frictionally with said clutch member;

a fluid pressure operated means for controlling the clutching capacity of said bypass clutch whereby clutch slip may be effected for a variety of engine and transmission conditions, electronically operated valve means for controlling the pressure applied to said fluid pressure operated means and for establishing a stroke mode pressure to actuate said clutch to a pre-engaged condition whereby further pressure increase will cause clutch engagement, said valve means being connected to and being responsive to an electronic processor having control logic that responds to changes in operating conditions of said transmission and engine:

said control logic determining a desired slip for each set of values for at least two operating conditions of said transmission;

means for determining a target slip for each set of said operating conditions;

means for determining the actual slip of said bypass clutch;

means for determining the desired slip for said bypass clutch for each operating condition of said transmission; and means for effecting a decay of the actual slip over time by calculating a value for slip that is a function of the difference between the actual slip and the target slip for each set of said operating conditions during operation in a clutch engage mode.

16. A torque converter bypass clutch assembly comprising a clutch plate, an impeller housing enclosing a turbine and an impeller, said clutch plate defining with said impeller housing a control pressure chamber, said plate being actuated by fluid pressure within said impeller housing with the pressure in said pressure chamber opposing the fluid pressure actuating said plate;

valve means for controlling said control pressure in accordance with variations in impeller torque and turbine speed whereby a controlled slip of said clutch is achieved;

means for establishing a stroke mode pressure to actuate said clutch to a pre-engaged condition whereby further pressure increase will cause clutch engagement;

means for determining a target slip of said clutch for each set of turbine speed and impeller torque values;

means for determining a desired slip for each set of said values; and means for effecting a decay in the actual slip of said clutch toward said target slip in accordance with a percentage of the difference between said actual slip and said target slip during operation of said clutch assembly in a engage mode.

17. In a friction bypass clutch assembly for a hydrokinetic torque converter comprising an impeller, a turbine and an impeller shell enclosing said impeller and said turbine, an engine being connected to said impeller shell;

a clutch plate within said impeller shell connected to said turbine, said clutch plate defining with said shell a control pressure chamber;

control passage means communicating with said control pressure chamber for distributing a clutch capacity determining control pressure to said chamber, bypass clutch control valve means communicating with said control pressure means, bypass clutch solenoid valve means communicating with said clutch control valve means;

electronic processor means for establishing a voltage signal for said solenoid valve means including means for sensing engine torque, means for sensing turbine speed, means for establishing a stroke mode pressure to actuate said clutch to a pre-engaged condition whereby further pressure increase will cause clutch engagement, means for establishing a desired slip of said clutch based upon the engine torque and turbine speed values, means for measuring the actual slip of said clutch, means for determining slip error, and means for establishing a control signal that is established as a function of a first constant proportional to slip error and a second constant that is determined by a derivative of said error during operation of said clutch assembly in an engage mode;

and means for subjecting said solenoid valve means to the control signal of said control signal establishing means.

18. The combination as set forth in claim 17 wherein said processor includes means for determining slip values in repetitive sequence and means for calculating a target slip for each control sequence, said desired slip being equal to the actual slip minus a predetermined percentage of the difference between said actual slip and said target slip.

19. A fluid pressure operated clutch assembly comprising:

a driving member, a driven member, each member having a friction surface thereon engagable by the other;

fluid pressure operated clutch actuator means for frictionally connecting said driving and driven members;

a pressure source, passage means defined in part by a clutch control valve for distributing control pressure to said actuator means;

electronically operated valve means for establishing a clutch control valve actuating pressure;

an electronic processor means for varying said actuating pressure according to variations in operating conditions including torque delivered by said clutch assembly and speed of one of said members;

said processor including means for storing a target slip for said clutch assembly for each set of values of said operating conditions, means for measuring actual slip by determining speed ratio of the speeds of said members and means for determining a calculated desired slip of said clutch assembly that is less than the actual slip at successive time intervals during clutch actuation whereby a slip decay occurs toward said target slip.

20. In a bypass clutch for a hydrokinetic torque converter for an automatic transmission and engine;

a clutch member connected to said engine, a converter having a friction surface adapted to cooperate frictionally with said clutch member;

a fluid pressure operated means for controlling the clutching capacity of said bypass clutch whereby clutch slip may be effected for a variety of engine and transmission conditions, electronically operated valve means for controlling the pressure applied to said fluid pressure operated means and for establishing a stroke mode pressure to actuate said clutch to a pre-engaged condition whereby further pressure increase will cause clutch engagement, said valve means being connected to and being responsive to an electronic processor having control logic that responds to changes in operating conditions of said transmission and engine;

said control logic determining a desired slip for each set of values for at least two operating conditions of said transmission;

means for determining a target slip for each set of said operating conditions;

means for determining the actual slip of said bypass clutch;

means for determining the desired slip for said bypass clutch for each operating condition of said transmission; and means for effecting a decay of the actual slip over time by calculating a value for slip that is less than the actual slip by a predetermined amount at successive time intervals during clutch actuation.

21. A torque converter bypass clutch assembly comprising a clutch plate, an impeller housing enclosing a turbine and an impeller, said clutch plate defining with said impeller housing a control pressure chamber, said plate being actuated by fluid pressure within said impeller housing with the pressure in said pressure chamber opposing the fluid pressure actuating said plate;

valve means for controlling said control pressure in accordance with variations in impeller torque and turbine speed whereby a controlled slip of said clutch is achieved;

means for establishing a stroke mode pressure to actuate said clutch to a pre-engaged condition whereby further pressure increase will cause clutch engagement;

means for determining a target slip of said clutch for each set of turbine speed and impeller torque values;

means for determining a desired slip for each set of said values; and means for effecting a decay in the actual slip of said clutch toward said target slip during operation of said clutch assembly in an engage mode.

22. A fluid pressure operated clutch assembly comprising:

a driving member, a driven member, each member having a friction surface thereon engagable by the other;

fluid pressure operated clutch actuator means for frictionally connecting said driving and driven members;

a pressure source, passage means defined in part by a clutch control valve for distributing control pressure to said actuator means;

electronically operated valve means for establishing a clutch control valve actuating pressure;

an electronic processor means for varying said actuating pressure according to variations in operating conditions including torque delivered by said clutch assembly and speed of one or said members;

said processor means including means for storing a target slip for said clutch assembly for each set of values of said operating conditions, means for determining a desired slip of said clutch assembly for said set of values by measuring actual slip and subtracting a percentage of the deference between said actual slip and said target slip; and means for measuring the speed ratio of the speeds of said members and for preventing distribution of control pressure to said actuator means when the speed ratio is less than a predetermined value for a given throttle setting.

23. A fluid pressure operated clutch assembly for a multiple speed ratio power transmission mechanism comprising:

a driving member, a driven member, each member having a friction surface thereon engagable by the other;

fluid pressure operated clutch actuator means for frictionally connecting said driving and driven members;

a pressure source, passage means defined in part by a clutch control valve for distributing control pressure to said actuator means;

electronically operated valve means for establishing a clutch control valve actuating pressure;

an electronic processor means for varying said actuating pressure according to variations in operating conditions including torque delivered by said clutch assembly and speed of one of said members;

said processor means including means for storing a target slip for said clutch assembly for each set of values of said operating conditions, means for determining a desired slip of said clutch assembly for said set of values by measuring actual slip and subtracting the difference between said actual slip and said target slip multiplied by a slip reduction factor less than unity whereby a controlled decay of the actual slip over time is calculated; and means for measuring the speed ratio of the speeds of said members and for preventing initiating of an engagement mode of said clutch assembly when the value for speed ratio is less than a predetermined value for a given throttle setting.

24. A fluid pressure operated clutch assembly comprising:
- a driving member, a driven member, each member having a friction surface thereon engagable by the other;
- fluid pressure operated clutch actuator means for frictionally connecting said driving and driven members;
- a pressure source, passage means defined in part by a clutch control valve for distributing control pressure to said actuator means;
- electronically operated valve means for establishing a clutch control valve actuating pressure;
- an electronic processor means for varying said actuating pressure according to variations in operating conditions including torque delivered by said clutch assembly and speed of one of said members;
- said processor including means for establishing a stroke mode pressure to actuate said clutch to a pre-engaged condition whereby further pressure increase will cause clutch engagement, means for storing a target slip for said clutch assembly for each set of values of said operating conditions, means for determining a desired slip of said clutch assembly for said set of values by measuring actual slip and subtracting a percentage of the difference between said actual slip and said target slip during operation in a clutch engage mode; and
- means for measuring the speed ratio of the speeds of said members and for preventing a transition of the operating state of said clutch assembly to an engaged mode when the value for speed ratio is less than a predetermined value for any given throttle setting.

* * * * *